(12) United States Patent
Mizuno et al.

(10) Patent No.: US 9,217,344 B2
(45) Date of Patent: Dec. 22, 2015

(54) HONEYCOMB FILTER

(71) Applicant: NGK INSULATORS, LTD., Nagoya (JP)

(72) Inventors: Atsushi Mizuno, Nagoya (JP); Suguru Kodama, Nagoya (JP); Yasushi Uchida, Nagoya (JP); Takahiro Kondo, Nagoya (JP); Yukio Miyairi, Nagoya (JP)

(73) Assignee: NGK Insulators, Ltd., Nagoya-Shi (JP)

( * ) Notice: Subject to any disclaimer, the term of this patent is extended or adjusted under 35 U.S.C. 154(b) by 73 days.

(21) Appl. No.: 14/064,487

(22) Filed: Oct. 28, 2013

(65) Prior Publication Data

US 2014/0116016 A1 May 1, 2014

(30) Foreign Application Priority Data

Oct. 30, 2012 (JP) .................................. 2012-239374

(51) Int. Cl.
*B01D 39/14* (2006.01)
*B01D 39/20* (2006.01)
(Continued)

(52) U.S. Cl.
CPC .......... *F01N 3/0222* (2013.01); *B01D 46/2425* (2013.01); *B01D 46/2429* (2013.01); *C04B 35/565* (2013.01); *C04B 35/584* (2013.01); *C04B 35/6263* (2013.01); *C04B 35/6316* (2013.01); *C04B 38/0009* (2013.01); *B01D 46/2444* (2013.01); *B01D 46/2448* (2013.01); *B01D 2046/2433* (2013.01); *C04B 2235/3217* (2013.01); *C04B 2235/349* (2013.01); *C04B 2235/3418* (2013.01);

(Continued)

(58) Field of Classification Search
CPC ... C04B 38/0006; C04B 35/00; F01N 3/0222; F01N 2330/06; B01D 46/0001; B01D 46/2429
See application file for complete search history.

(56) References Cited

U.S. PATENT DOCUMENTS

| 4,973,564 | A | * | 11/1990 | Chyung et al. | 501/32 |
| 5,549,725 | A | * | 8/1996 | Kasai et al. | 55/523 |

(Continued)

FOREIGN PATENT DOCUMENTS

| JP | 2002-253916 A1 | 9/2002 |
| JP | 2003176185 | * 6/2003 |

(Continued)

OTHER PUBLICATIONS

Kuwamoto, Ceramic Porous Body and Ceramic Filter, Jun. 2003, Translation of JP2003176185.*

(Continued)

*Primary Examiner* — Amber Orlando
(74) *Attorney, Agent, or Firm* — Burr & Brown, PLLC

(57) ABSTRACT

A honeycomb filter includes a honeycomb structure and plugged portions. Partition walls of the honeycomb structure are made of a partition wall material including a plurality of aggregates containing silicon carbide or silicon nitride as a main component, and a binding material at a content of 15 to 35 mass %. The binding material is made of a material in which mullite particles as reinforcing particles may be dispersed in cordierite. A thermal expansion coefficient of the partition walls at 40 to 800° C. is $4.2 \times 10^{-6}$ 1/K or less. When a value of a stress applied to the partition wall material at 900° C. is normalized by the maximum value of the stress applied to the partition wall material, a percentage of a plastic deformation displacement in a total displacement at a normalized stress value of 0.9 is in a range of 0.3 to 10%.

11 Claims, 6 Drawing Sheets

(51) Int. Cl.
  *B01D 39/06* (2006.01)
  *B01D 24/00* (2006.01)
  *F01N 3/022* (2006.01)
  *B01D 46/24* (2006.01)
  *C04B 35/565* (2006.01)
  *C04B 35/584* (2006.01)
  *C04B 35/626* (2006.01)
  *C04B 35/63* (2006.01)
  *C04B 38/00* (2006.01)

(52) U.S. Cl.
  CPC .......... *C04B 2235/3463* (2013.01); *C04B 2235/3481* (2013.01); *C04B 2235/5436* (2013.01); *C04B 2235/5445* (2013.01); *C04B 2235/656* (2013.01); *C04B 2235/6584* (2013.01); *C04B 2235/663* (2013.01); *C04B 2235/80* (2013.01); *C04B 2235/96* (2013.01); *C04B 2235/9607* (2013.01); *C04B 2237/708* (2013.01); *F01N 2330/06* (2013.01)

(56) References Cited

U.S. PATENT DOCUMENTS

| | | | |
|---|---|---|---|
| 6,669,751 B1 * | 12/2003 | Ohno et al. | 55/523 |
| 2003/0138596 A1 | 7/2003 | Harada et al. | |
| 2004/0033893 A1 | 2/2004 | Tomita et al. | |
| 2005/0158534 A1 | 7/2005 | Tabuchi et al. | |
| 2006/0019813 A1 * | 1/2006 | Yoshii | 501/15 |
| 2006/0121239 A1 | 6/2006 | Furukawa et al. | |
| 2007/0033912 A1 | 2/2007 | Furukawa et al. | |
| 2007/0054803 A1 * | 3/2007 | Miyairi | 502/439 |
| 2008/0085394 A1 * | 4/2008 | Ohno et al. | 428/117 |
| 2010/0093528 A1 * | 4/2010 | Furuta et al. | 502/339 |
| 2010/0135866 A1 * | 6/2010 | Mizuno et al. | 422/180 |
| 2010/0218473 A1 * | 9/2010 | Kikuchi et al. | 55/523 |
| 2012/0017554 A1 * | 1/2012 | Iwasaki et al. | 55/488 |
| 2013/0255212 A1 * | 10/2013 | Takahashi et al. | 55/524 |
| 2014/0011667 A1 | 1/2014 | Tomita et al. | |
| 2014/0311112 A1 * | 10/2014 | Toyoshima et al. | 55/529 |

FOREIGN PATENT DOCUMENTS

| | | |
|---|---|---|
| WO | 2012/128149 A1 | 9/2012 |
| WO | 2013/146953 A1 | 10/2013 |
| WO | 2013/146954 A1 | 10/2013 |

OTHER PUBLICATIONS

Extended European Search Report from a corresponding European patent application bearing a mailing date of Mar. 18, 2014, 7 pages.

* cited by examiner

HONEYCOMB FILTER

The present application is an application based on JP-2012-239374 filed on Oct. 30, 2012 with the Japanese Patent Office, the entire contents of which are incorporated herein by reference.

BACKGROUND OF THE INVENTION

1. Field of the Invention

The present invention relates to a honeycomb filter. More particularly, it relates to a honeycomb filter capable of suitably collecting particulate matters included in an exhaust gas discharged from an engine, especially an engine of a car.

2. Description of Related Art

A diesel engine is advantageous as an engine for a car which has a better heat efficiency than a gasoline engine and which matches a demand for a decrease of carbon dioxide emissions as a global warming countermeasure. On the other hand, the diesel engine discharges an exhaust gas including a large amount of particulate matters by diffusion combustion.

It has been pointed out that the particulate matters in the exhaust gas affect environments and human bodies, and measures to prevent the particulate matters in the exhaust gas from being discharged to the atmospheric air have been required. Heretofore, the amount of the particulate matters in the exhaust gas to be discharged from the diesel engine has been regulated in accordance with a mass ratio of the particulate matters in the exhaust gas. Moreover, in recent years, in addition to the above-mentioned regulation in accordance with the mass ratio of the particulate matters, a stricter exhaust gas regulation has been performed on the number of particulates in the exhaust gas.

An example of a method of decreasing a mass of the particulate matters or the number of the particulates in the exhaust gas discharged from the diesel engine is a method of improving the combustion in the diesel engine. However, in such a method of improving the combustion, there is a limit to the decrease of the mass of the particulate matters or the number of the particulates. Therefore, it is considered that a method of disposing a filter in an exhaust system of the diesel engine to collect the particulate matters in the exhaust gas by this filter is an effective method for decreasing the mass of the particulate matters or the number of the particulates in the exhaust gas.

An example of the filter to collect the particulate matters in the exhaust gas is a wall flow type filter including porous partition walls. In such a wall flow type filter, the exhaust gas permeates the porous partition walls, and the particulate matters in the exhaust gas are collected by the porous partition walls.

In the wall flow type filter, for the purpose of decreasing a pressure loss, it is necessary to lower a filtration speed. Therefore, in recent years, as the filter to collect the particulate matters in the exhaust gas, there has broadly been used a honeycomb filter using a honeycomb structure including a plurality of cells defined and formed by porous partition walls. In this honeycomb filter, among the cells formed in the honeycomb structure, open frontal areas of the predetermined cells in one end surface and open frontal areas of the remaining cells in the other end surface are plugged by plugged portions. The honeycomb filter has the honeycomb structure including the plurality of cells defined and formed by the partition walls, and hence a filtering area through which the exhaust gas passes can be increased.

When a particulate matter such as soot in the exhaust gas is collected by the honeycomb filter, the collected particulate matter is deposited on the partition walls. When the particulate matters are continuously collected by the honeycomb filter, the pressure loss of the honeycomb filter increases due to the particulate matters deposited on the partition walls. For decreasing the pressure loss of the honeycomb filter, it is necessary to forcibly burn and remove the particulate matters by applying a high temperature gas to the particulate matters deposited on the partition walls. The burning and removing of the particulate matters is often referred to as regeneration of filter.

At the regeneration of the filter, a heat stress is generated in the filter by heat of the burning of a particulate matter such as soot, and the generated heat stress causes damage to the filter which is being regenerated, sometimes. To prevent the filter from being damaged by the heat stress, there has been suggested a technology in which a plurality of honeycomb segments are prepared, and the plurality of honeycomb segments are bonded to manufacture a honeycomb filter (e.g., see Patent Document 1). In the honeycomb filter disclosed in Patent Document 1, the plurality of honeycomb segments are bonded by an easily deformable bonding material having a small elastic modulus. Hereinafter, the honeycomb filter manufactured by bonding the plurality of honeycomb segments will be referred to as "honeycomb filter having segment structure" sometimes.

RELATED-ART DOCUMENT

Patent Document

[Patent Document 1] JP-A-2002-253916

SUMMARY OF THE INVENTION

A honeycomb filter having segment structure can decrease a heat stress generated in various portions of the filter as compared with a honeycomb filter manufactured by using one honeycomb structure. However, even the honeycomb filter having segment structure has the problem that a stress alleviating effect cannot sufficiently be obtained in an outflow end surface of the honeycomb filter in which it is most difficult to alleviate the heat stress. In particular, an excessively large temperature rise may locally occur in the outflow end surface of the honeycomb filter, although it may occur at a very low frequency. Such a local temperature rise takes place in one segment in the honeycomb filter having segment structure, and hence advantages of the segment structure are not sufficiently exerted. It is to be noted that when the local temperature rise takes place, a low temperature portion is pulled due to expansion of a high temperature portion. A tensile stress is generated in a low temperature region including this low temperature portion, and cracks are generated in the low temperature portion.

Moreover, heretofore, a honeycomb filter has been suggested in which a material having a large heat capacity is used to prevent the honeycomb filter from being damaged by an excessively large temperature rise during regeneration of the filter. For example, a honeycomb filter including partition walls containing silicon carbide as a main component has been suggested. However, in such a honeycomb filter, a thermal expansion coefficient of silicon carbide is excessively large, and hence there has been the problem that cracks due to heat stress are easily generated.

The present invention has been developed in view of the above-mentioned problems, and an object thereof is to provide a honeycomb filter capable of suitably collecting particulate matters included in an exhaust gas. In particular, there is provided a honeycomb filter which is not easily damaged by a heat stress generated in the honeycomb filter.

According to the present invention, a honeycomb filter is provided as follows.

According to a first aspect of the present invention, a honeycomb filter is provided, including a tubular honeycomb structure having porous partition walls, which define and form a plurality of cells extending from an inflow end surface to an outflow end surface, and a plurality of plugged portions, which plug open frontal areas of the first cells on the side of the inflow end surface among the cells formed in the honeycomb structure, and open frontal areas of the second cells other than the first cells on the side of the outflow end surface. The partition walls are made of a partition wall material including a plurality of aggregates containing silicon carbide or silicon nitride as a main component, and a binding material which binds the aggregates to one another in a state where pores, are formed so that a porosity of the partition walls is from 35 to 70%. The partition wall material contains 15 to 35 mass % of the binding material in a total mass of the aggregates and the binding material. The binding material is made of a material in which mullite particles as reinforcing particles are dispersed in cordierite, or a material in which cordierite is contained as a main component. A thermal expansion coefficient of the partition walls at 40 to 800° C. is $4.2 \times 10^{-6}$ 1/K or less. When a value of a stress applied to the partition wall material at 900° C. is normalized by the maximum value of the stress applied to the partition wall material, a percentage of a plastic deformation displacement in a total displacement at a normalized stress value of 0.9 is in a range of 0.3 to 10%.

According to a second aspect of the present invention, the honeycomb filter according to the above first aspect is provided, which is a filter to collect fine particles in an exhaust gas discharged from a car.

According to a third aspect of the present invention, the honeycomb filter according to the above first or second aspects is provided, wherein a cell density of the honeycomb structure is 23 cells/cm$^2$ or more and 60 cells/cm$^2$ or less.

According to a fourth aspect of the present invention, the honeycomb filter according to any one of the above first to third aspects is provided, wherein a thickness of each of the partition walls of the honeycomb structure is 120 μm or more and 400 μm or less.

According to a fifth aspect of the present invention, the honeycomb filter according to any one of the above first to fourth aspects is provided, wherein a bending strength is 6.5 MPa or more, and a value obtained by dividing a value of the bending strength by a value of Young's modulus (bending strength/Young's modulus) is $1.4 \times 10^{-3}$ or more.

EFFECT OF THE INVENTION

In a honeycomb filter of the present invention, partition walls constituting a honeycomb structure are made of a partition wall material including a plurality of aggregates containing silicon carbide or silicon nitride as a main component, and a binding material which binds the aggregates to one another in a state where pores are formed so that a porosity of the partition walls is from 35 to 70%. Moreover, the partition wall material constituting the partition walls contains 15 to 35 mass % of the binding material in a total mass of the aggregates and the binding material, and this binding material is made of a material in which mullite particles as reinforcing particles are dispersed in cordierite, or a material containing cordierite as a main component. Furthermore, a thermal expansion coefficient of the partition walls at 40 to 800° C. is $4.2 \times 10^{-6}$ 1/K or less. Additionally, when a value of a stress applied to the partition wall material at 900° C. is normalized by the maximum value of the stress applied to this partition wall material, the following conditions are satisfied. That is, a percentage of a plastic deformation displacement in a total displacement at a normalized stress value of 0.9 is in a range of 0.3 to 10%.

In the honeycomb filter having such a constitution, damage caused to the honeycomb filter by a heat stress can effectively be prevented. That is, the honeycomb structure constituting the honeycomb filter of the present invention has characteristics that when a high temperature portion is locally generated in the honeycomb structure, this high temperature portion is plastically deformed in a high temperature state. For example, in the honeycomb filter of the present invention, when an excessively large temperature rise locally takes place in an outflow end surface of the honeycomb filter, the high temperature portion is plastically deformed, and a force that the high temperature portion pulls a low temperature portion is restricted. Therefore, the above low temperature portion can effectively be prevented from being damaged. It is to be noted that "the low temperature portion" is a portion other than a portion where the excessively large temperature rise locally takes place (i.e., the high temperature portion), and a temperature of the portion is lower than that of the high temperature portion.

In the honeycomb filter of the present invention, the partition wall material of the honeycomb structure has the characteristics that the high temperature portion is plastically deformed in the high temperature state, and hence an excellent heat stress decreasing effect can be expected in a remarkably local temperature change. For example, even in a conventional honeycomb filter having segment structure, the heat stress decreasing effect is not sufficiently exerted sometimes for a temperature change generated in one honeycomb segment. In the honeycomb filter of the present invention, the honeycomb structure, i.e., the partition wall material constituting this honeycomb structure is plastically deformed in the high temperature state as described above. Therefore, for example, in a local temperature change generated in one honeycomb segment, a sufficient heat stress decreasing effect can be obtained.

DETAILED DESCRIPTION OF THE INVENTION

Hereinafter, embodiments of the present invention will specifically be described with reference to the drawings. It should be understood that the present invention is not limited to the following embodiments and that suitable modifications, improvements and the like added to the following embodiments on the basis of ordinary knowledge of a person skilled in the art without departing from the gist of the present invention also fall in the gist of the present invention.

Figure 1:
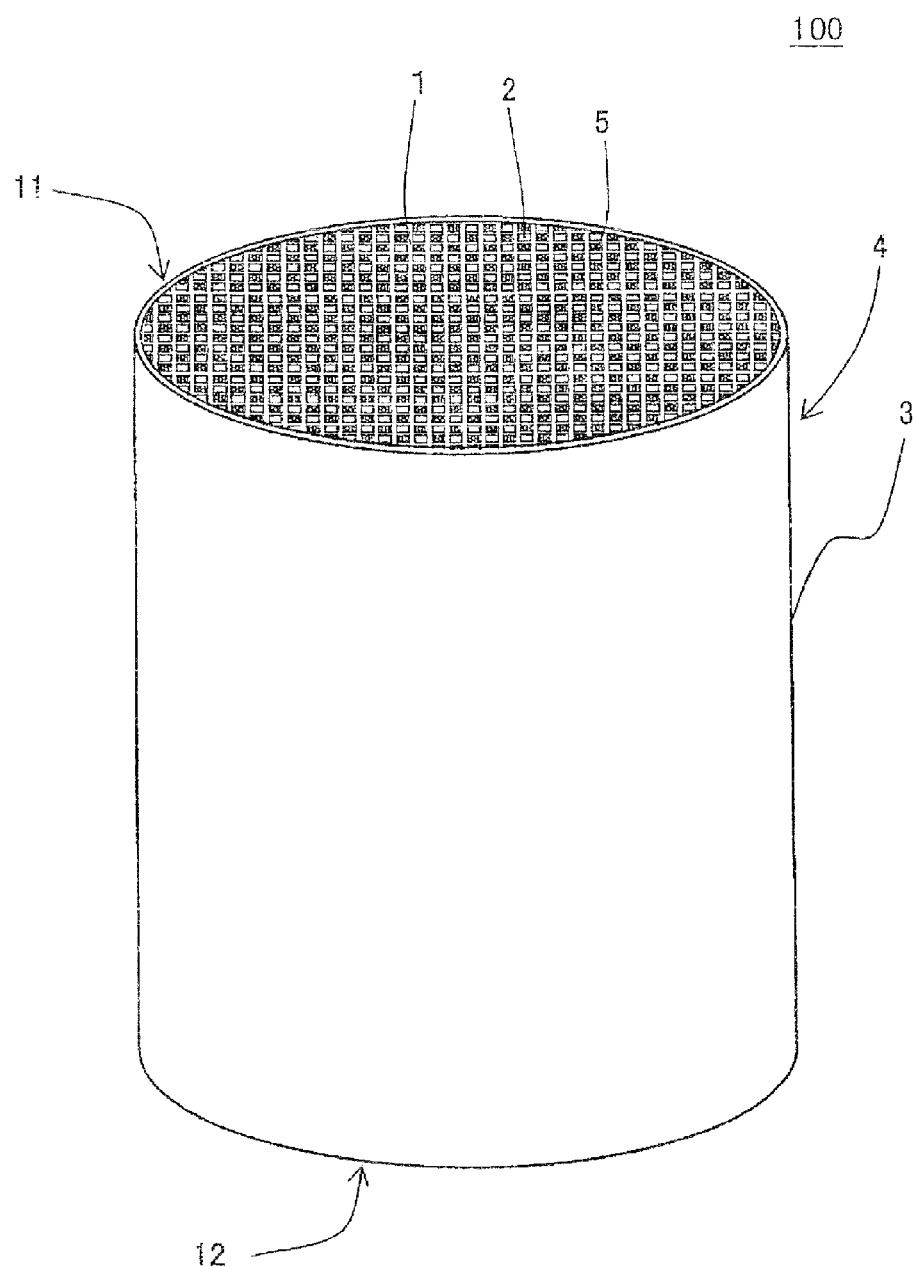
FIG. 1 is a perspective view schematically showing one embodiment of a honeycomb filter of the present invention.
Figure 2:
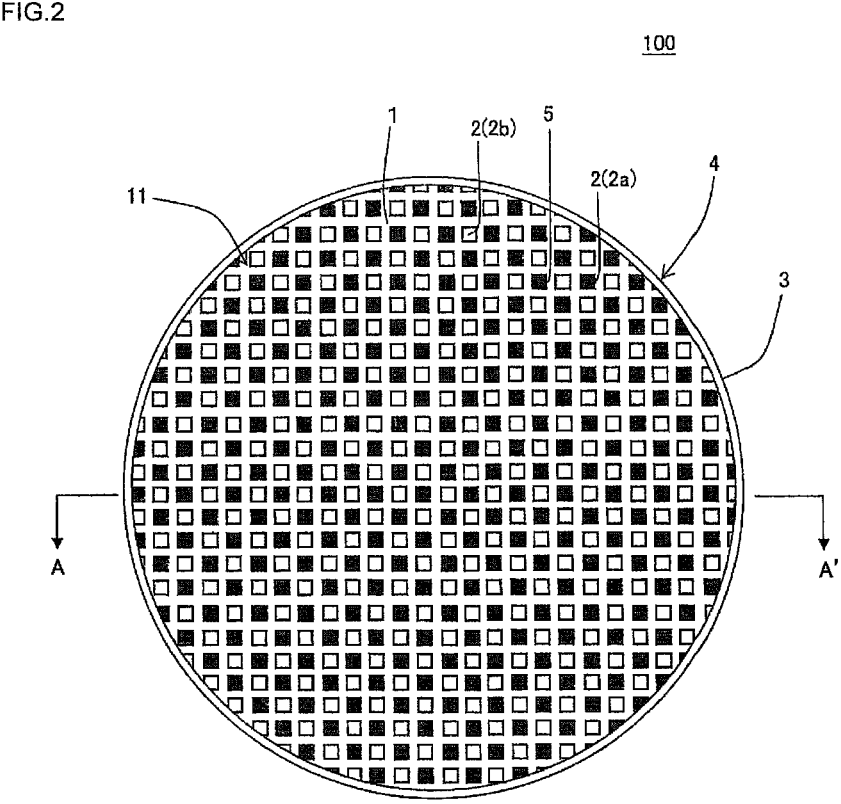
FIG. 2 is a plan view schematically showing an inflow end surface of the one embodiment of the honeycomb filter of the present invention.
Figure 3:
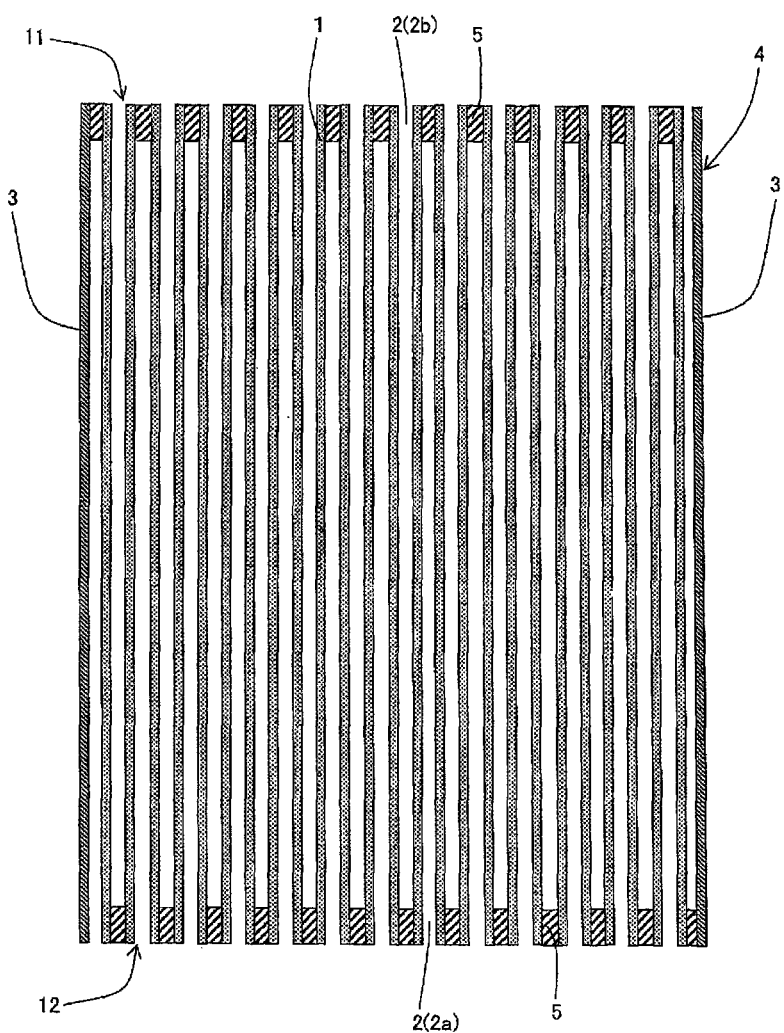
FIG. 3 is a cross sectional view schematically showing a cross section cut along the A-A' line of FIG. 2.

(1) Honeycomb Filter:

One embodiment of a honeycomb filter of the present invention is a honeycomb filter 100 shown in FIG. 1 to FIG. 3. As shown in FIG. 1 to FIG. 3, the honeycomb filter 100 of the present embodiment is the honeycomb filter 100 including a honeycomb structure 4 having porous partition walls 1, and a plurality of plugged portions 5. Here, FIG. 1 is a perspective view schematically showing the one embodiment of the honeycomb filter of the present invention. FIG. 2 is a plan view schematically showing an inflow end surface of the one embodiment of the honeycomb filter of the present invention. FIG. 3 is a cross sectional view schematically showing a cross section cut along the line A-A' of FIG. 2.

The honeycomb structure 4 is a tubular structure having the porous partition walls 1 which define and form a plurality of cells 2 extending from an inflow end surface 11 to an outflow end surface 12. The plurality of cells 2 become through channels of a fluid (more specifically, an exhaust gas). The honeycomb structure 4 preferably has an outer wall 3 positioned in the outermost periphery. The plugged portions 5 plug open frontal areas of first cells 2a on the side of the inflow end surface 11 among the cells 2 formed in the honeycomb structure 4, and open frontal areas of second cells 2b other than the first cells 2a on the side of the outflow end surface 12.

The honeycomb filter 100 of the present embodiment is a wall flow type filter in which ends of the cells 2 formed in the honeycomb structure 4 on the inflow end surface 11 side or the outflow end surface 12 side are plugged by the plugged portions 5. More specifically, the plugged portions 5 plug the open frontal areas of the first cells 2a on the inflow end surface 11 side among the cells 2 formed in the honeycomb structure 4, and the open frontal areas of the second cells 2b other than the first cells 2a on the outflow end surface 12 side. In "the first cells 2a", the plugged portions 5 are arranged in the open frontal areas of the cells 2 in the inflow end surface 11. In "the second cells 2b", the plugged portions 5 are arranged in the open frontal areas of the cells 2 in the outflow end surface 12. In the honeycomb filter 100 of the present embodiment, a fluid such as an exhaust gas flows into the open frontal areas of the second cells 2b in the inflow end surface 11. On the other hand, the fluid such as the exhaust gas cannot directly flow into the first cells 2a, and the fluid which has flowed into the second cells 2b passes through the partition walls 1, flows into the first cells 2a, and is discharged from the open frontal areas of the first cells 2a in the outflow end surface 12. When the fluid moves from the second cells 2b to the first cells 2a, particulate matters in the fluid are collected by the porous partition walls 1.

In the honeycomb filter 100 of the present embodiment, the partition walls 1 are made of a partition wall material including a plurality of aggregates containing silicon carbide or silicon nitride as a main component, and a binding material which binds the aggregates to one another in a state where pores are formed so that a porosity of the partition walls 1 is from 35 to 70%. Hereinafter, in the honeycomb filter 100 of the present embodiment, the partition wall material constituting the partition walls 1 will be referred to as "a specific partition wall material" sometimes. Moreover, when the aggregates "contain silicon carbide or silicon nitride as the main component", it is meant that 90 mass % or more of silicon carbide or silicon nitride is included in constituent components of the aggregates.

Moreover, the above-mentioned specific partition wall material contains 15 to 35 mass % of the binding material in a total mass of the aggregates and the binding material. Furthermore, the binding material is made of a material in which mullite particles as reinforcing particles are dispersed in cordierite, or a material in which cordierite is contained as a main component. "The material in which cordierite is contained as the main component" means that 90 mass % or more of cordierite is contained in the constituent components of the binding material. Moreover, the binding material made of the material in which the mullite particles as the reinforcing particles are dispersed in cordierite will be referred to as "a composite binding material" sometimes.

Figure 4:
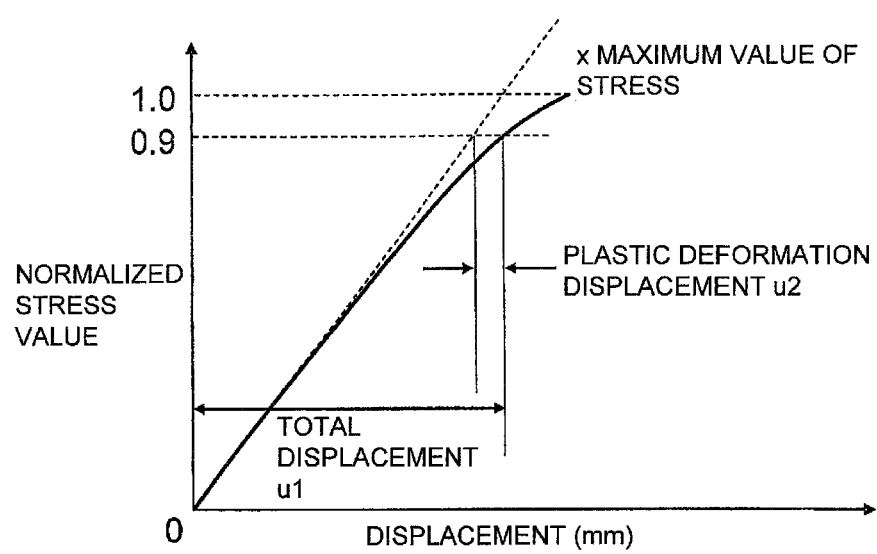
FIG. 4 is a graph showing an example of a relation between a stress applied to a partition wall material constituting a honeycomb structure and a displacement the partition wall material to which the stress is applied at 900° C.

In the honeycomb filter 100 of the present embodiment, a thermal expansion coefficient of the partition walls 1 at 40 to 800° C. is $4.2 \times 10^{-6}$ 1/K or less. The thermal expansion coefficient is a value obtained by measuring an average linear thermal expansion coefficient (the thermal expansion coefficient) at 40 to 800° C. by a method conformable to JIS R 1618. Furthermore, when a value of a stress applied to the partition wall material at 900° C. is normalized by the maximum value of the stress applied to this partition wall material, a percentage of a plastic deformation displacement in a total displacement at a normalized stress value of 0.9 is in a range of 0.3 to 10%. That is, in the honeycomb filter 100 of the present embodiment, the specific partition wall material constituting the partition walls 1 satisfies the following conditions. Here, FIG. 4 is a graph showing an example of a relation between the stress applied to the partition wall material constituting the honeycomb structure and the displacement of the partition wall material to which the stress is applied, at 900° C. As shown in FIG. 4, first, the relation between the stress and the displacement (e.g., the relation between the stress and the displacement in the graph of FIG. 4) is normalized by the maximum value of the stress applied to the partition wall material. In the honeycomb filter 100 of the present embodiment, a percentage of a plastic deformation displacement u2 in a total displacement u1 at the normalized stress value of 0.9 at 900° C. is in a range of 0.3 to 10%.

In the honeycomb filter 100 of the present embodiment, the partition walls 1 of the honeycomb structure 4 are made of the above-mentioned specific partition wall material, and hence damage caused to the honeycomb filter 100 by a heat stress can effectively be prevented. That is, the partition wall material of the honeycomb structure 4 constituting the honeycomb filter 100 of the present embodiment has characteristics that when a high temperature portion is locally generated in the honeycomb structure 4, this high temperature portion is plastically deformed in a high temperature state. For example, in the honeycomb filter 100 of the present embodiment, when an excessively large temperature rise locally takes place in the outflow end surface 12 of the honeycomb filter 100, the high temperature portion is plastically deformed, and the force that the high temperature portion pulls the low temperature portion is restricted. Therefore, the above low temperature portion can effectively be prevented from being damaged.

In the honeycomb filter 100 of the present embodiment, an excellent heat stress decreasing effect can be expected in a remarkably local temperature change. For example, even in a conventional honeycomb filter having segment structure, the heat stress decreasing effect is not sufficiently exerted sometimes for a temperature change generated in one honeycomb segment. The honeycomb filter 100 of the present embodiment has characteristics that the partition wall material of the partition walls 1 constituting the honeycomb structure 4 is plastically deformed in the high temperature state. Therefore, for example, in the local temperature change generated in the one honeycomb segment, a sufficient heat stress decreasing effect can be obtained. Needless to say, an excellent heat stress decreasing effect can also be expected in the integral type honeycomb filter 100 shown in FIGS. 1 to 3.

Figure 5:
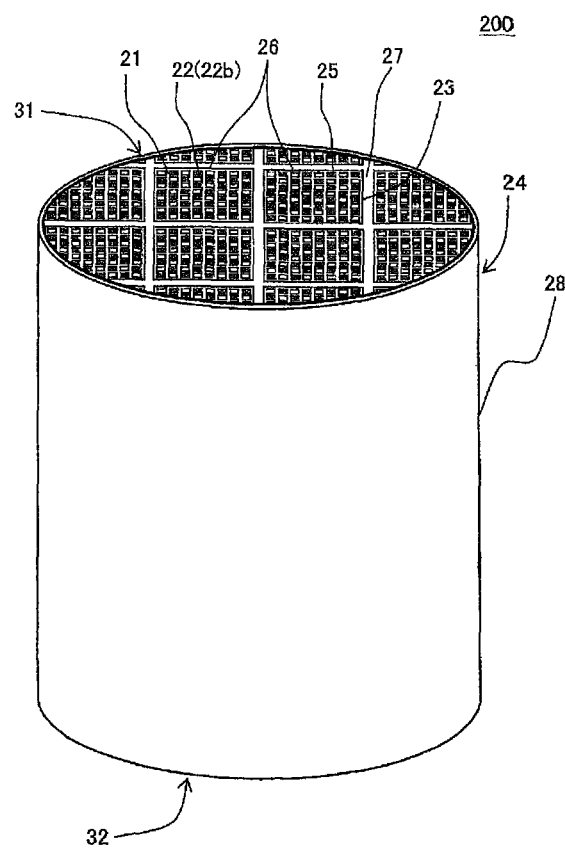
FIG. 5 is a perspective view schematically showing another embodiment of the honeycomb filter of the present invention.
Figure 6:
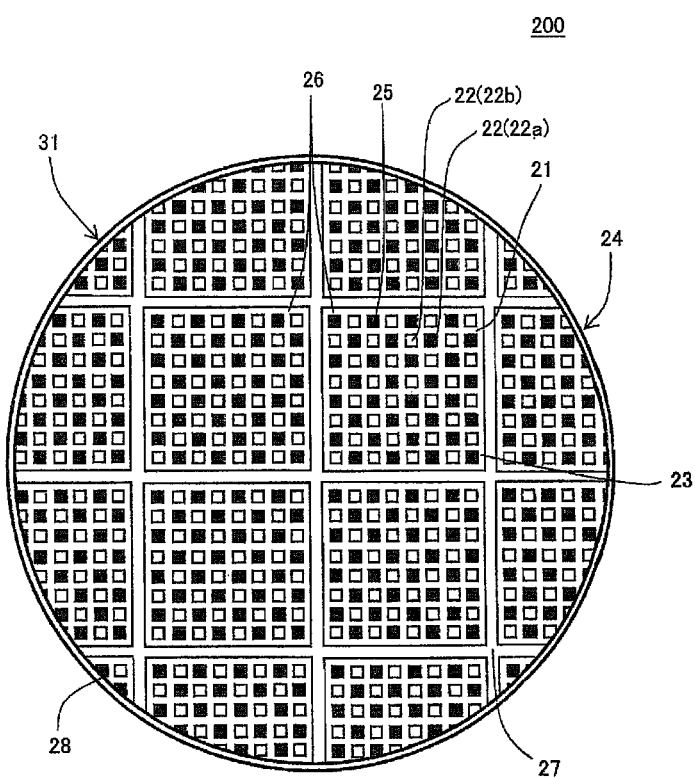
FIG. 6 is a plan view schematically showing an inflow end surface of the another embodiment of the honeycomb filter of the present invention.

The honeycomb filter 100 shown in FIG. 1 to FIG. 3 is the so-called integral type honeycomb filter 100 manufactured by using a single honeycomb structure 4. However, the honeycomb filter of the present invention is not limited to the integral type honeycomb filter, and may be the honeycomb filter having segment structure. Here, FIG. 5 is a perspective view schematically showing another embodiment of the honeycomb filter of the present invention. FIG. 6 is a plan view schematically showing an inflow end surface of the another embodiment of the honeycomb filter of the present invention.

A honeycomb filter 200 shown in FIG. 5 and FIG. 6 is the honeycomb filter 200 having segment structure including a plurality of honeycomb segments 26, a plurality of plugged portions 25, and bonding layers 27. The plurality of honeycomb segments 26 are bonded by the bonding layers 27 to form a honeycomb structure 24. The outer peripheral surface of the honeycomb structure 24 is provided with an outer periphery coating layer 28. That is, the outer periphery coating layer 28 is disposed to surround a periphery of the honeycomb segments 26 bonded by the bonding layers 27. The outer periphery coating layer 28 is preferably formed by applying a ceramic material to an outer peripheral portion of a bonded assembly in which the plurality of honeycomb segments 26 are bonded in a state where the segments are arranged so that side surfaces of the segments face each other.

Each of the honeycomb segments 26 is a tubular segment having partition walls 21 which define and form a plurality of cells 22 extending from an inflow end surface 31 to an outflow end surface 32. The honeycomb segment 26 may further have an outer wall 23 positioned in the outermost periphery. In the honeycomb filter 200 shown in FIG. 5 and FIG. 6, 16 honeycomb segments 26 are bonded by the bonding layers 27.

In the honeycomb filter 200 of the present embodiment, ends of the cells 22 formed in the honeycomb segments 26 on the side of the inflow end surface 31 or the outflow end surface 32 are plugged by the plugged portions 25. That is, the plugged portions 25 plug open frontal areas of first cells 22a on the inflow end surface 31 side among the cells 22 formed in the honeycomb segments 26, and plug open frontal areas of second cells 22b other than the first cells 22a on the outflow end surface 32 side. In "the first cells 22a", the plugged portions 25 are arranged in the open frontal areas of the cells 22 in the inflow end surface 31. In "the second cells 22b", the plugged portions 25 are arranged in the open frontal areas of the cells 22 in the outflow end surface 32. In the honeycomb filter 200 of the present embodiment, a fluid such as an exhaust gas flows into the open frontal areas of the second cells 22b in the inflow end surface 31. On the other hand, the fluid such as the exhaust gas cannot directly flow into the first cells 22a, and the fluid which has flowed into the second cells 22b passes through the partition walls 21, flows into the first cells 22a, and is discharged from the open frontal areas of the first cells 22a in the outflow end surface 32. When the fluid moves from the second cells 22b to the first cells 22a, particulate matters in the fluid are collected by the porous partition walls 21. In the honeycomb filter 200 of the present embodiment, the partition walls 21 constituting the respective honeycomb segments 26 have a constitution similar to the partition walls 1 of the honeycomb filter 100 shown in FIG. 1 to FIG. 3. That is, the partition walls 21 constituting the respective honeycomb segments 26 are made of the above-mentioned specific partition wall material. As the plugged portions 25 which plug the open frontal areas of the cells 22, plugged portions having a constitution similar to the plugged portions 5 of the honeycomb filter 100 shown in FIG. 1 to FIG. 3 can suitably be used.

In the honeycomb filter 200 shown in FIG. 5 and FIG. 6, among the 16 honeycomb segments 26 bonded by the bonding layers 27, the four honeycomb segments 26 arranged in a central portion are tubular segments each having quadrangular end surface. Moreover, among the 16 honeycomb segments 26 bonded by the bonding layers 27, outer peripheries of the 12 honeycomb segments 26 arranged in an outer peripheral portion are subjected to grind processing in accordance with the whole shape (a cylindrical shape) of the honeycomb filter 200. The outer peripheral portion of the honeycomb filter 200 is provided with the outer periphery coating layer 28 to surround the 16 honeycomb segments 26 bonded by the bonding layers 27. Hereinafter, among the honeycomb segments 26 bonded by the bonding layers 27, the honeycomb segments arranged in the central portion and each having an outer periphery which is not ground will be referred to as complete segments sometimes. Moreover, among the honeycomb segments 26 bonded by the bonding layers 27, the honeycomb segments arranged in the outer peripheral portion and each having ground outer periphery will be referred to as incomplete segments sometimes. Hereinafter, in the description of the honeycomb segments, the complete segments will be described as examples unless otherwise noted. It is to be noted that the incomplete segment is obtained by grinding the outer periphery of the complete segment in accordance with the whole shape of the honeycomb filter 200. Therefore, the incomplete segment prior to the grind processing preferably has a constitution similar to the complete segment.

In the honeycomb filter 200 having such a segment structure, a heat stress generated in each portion can be decreased by the bonding layers 27. Furthermore, the partition walls 21 of the individual honeycomb segments 26 are made of the above-mentioned specific partition wall material, and hence an excellent heat stress decreasing effect can be expected in a remarkably local temperature change generated in each of the honeycomb segments 26.

There is not any special restriction on the whole shape of the honeycomb filter 100 shown in FIG. 1 to FIG. 3, however the shape is preferably a cylindrical shape, a tubular shape with elliptic or race track-like end surfaces, a prismatic columnar shape with end surfaces having a polygonal shape such as "a square shape, a rectangular shape, a triangular shape, a pentangular shape, a hexagonal shape, or an octagonal shape, or the like". The whole shape of the honeycomb filter 100 is more preferably the cylindrical shape, or the tubular shape with the elliptic or race track-like end surfaces, from the viewpoints that an excessively small curvature radius is avoided and that stress concentration is avoided. The honeycomb filter 100 shown in FIG. 1 to FIG. 3 shows an example of the cylindrical shape. Moreover, the whole shape of the honeycomb filter 200 shown in FIG. 5 and FIG. 6 is preferably a cylindrical shape, a tubular shape with elliptic or race track-like end surfaces, a prismatic columnar shape with end surfaces having a polygonal shape such as "a square shape, a rectangular shape, a triangular shape, a pentangular shape, a hexagonal shape, or an octagonal shape, or the like".

Hereinafter, each constituent element of the honeycomb filter of the present embodiment will be described in more detail.

(1-1) Honeycomb Structure:

As shown in FIG. 1 to FIG. 3, the honeycomb structure 4 is a tubular structure having the partition walls 1 which define and form the plurality of cells 2 extending from the inflow end surface 11 to the outflow end surface 12. As shown in FIG. 5 and FIG. 6, the honeycomb structure 24 may be a bonded structure wherein the plurality of honeycomb segments 26 are bonded by the bonding layers 27.

In the honeycomb filter of the present embodiment, the partition walls are made of the above-mentioned specific partition wall material. The specific partition wall material includes a plurality of aggregates containing silicon carbide or silicon nitride as the main component, and a binding material which binds the aggregates to one another in the state where the pores are formed so that the porosity of the partition walls 1 is from 35 to 70%.

Examples of the aggregates containing silicon carbide or silicon nitride as the main component include silicon carbide particles and silicon nitride particles. An average particle diameter of the silicon carbide particles or the silicon nitride particles is preferably from 5 to 100 μm, and further preferably from 10 to 40 μm. The average particle diameter of the silicon carbide particles or the silicon nitride particles is a value measured by a laser diffraction method.

The specific partition wall material contains 15 to 35 mass % of the binding material, preferably contains 20 to 35 mass % of the binding material, and further preferably contains 25 to 30 mass % of the binding material in the total mass of the aggregates and the binding material. When a mass ratio of the binding material is smaller than 15 mass %, a binding force of the binding material becomes insufficient, and a strength of the partition wall material comes short sometimes. On the other hand, when the mass ratio of the binding material is in excess of 35 mass %, a thermal conductivity decreases. At regeneration of the filter or the like, heat of burning of soot is not easily released, and a temperature of the partition wall material excessively rises, thereby causing damage due to the heat stress sometimes. The mass ratio of the binding material to the total mass of the aggregates and the binding material can be obtained by the following method. First, an X-ray diffraction pattern of the material constituting the partition walls is obtained by using an X-ray diffracting device. As the X-ray diffracting device, a rotating anticathode type X-ray diffracting device is used. An example of the rotating anticathode type X-ray diffracting device is "RINT (trade name)" manufactured by Rigaku Denki. Conditions of X-ray diffraction measurement are CuKα ray source, 50 kV, 300 mA, and 2θ=10 to 60°. Moreover, a mass ratio of each constituent crystal phase is calculated by simple quantitative analysis. An example of the simple quantitative analysis is a method in which obtained X-ray diffraction data is analyzed by using a reference intensity ratio (RIR) process to determine a quantity of each component. The X-ray diffraction data can be analyzed by using "X-ray data analysis software JADE7 (trade name)" manufactured by MDI Co.

Moreover, the binding material is made of a material in which the mullite particles as the reinforcing particles are dispersed in cordierite, or the material in which cordierite is contained as the main component. The material containing cordierite as the main component means a raw material from which cordierite crystals are produced by firing. An example of the material containing cordierite as the main component is mixed powder of 35.9 mass % of talc, 44.3 mass % of aluminum hydroxide, and 19.8 mass % of silica powder. A binding material producing raw material is prepared by using such mixed powder, and fired, thereby making it possible to obtain the binding material made of the material containing cordierite as the main component. The binding material producing raw material is not limited to the above-mentioned mixed powder. Hereinafter, "the raw material from which the cordierite crystals are produced by the firing" will be referred to as "a cordierite forming raw material" sometimes.

An example of the material in which the mullite particles as the reinforcing particles are dispersed in cordierite is a material in which the mullite particles are dispersed in the above-mentioned material containing cordierite as the main component. An average particle diameter of the mullite particles is preferably from 0.1 to 10 μm, and further preferably from 0.2 to 5 μm. The average particle diameter of the mullite particles is a value measured by the laser diffraction method. There is not any special restriction on a blend ratio of the mullite particles, however the blend ratio is preferably 50 mass % or less, and further preferably 35 mass % or less of a total mass of the binding material. There is not any special restriction on a lower limit value of the blend ratio of the mullite particles. That is, a material in which the mullite particles are not blended (dispersed) is the above material containing cordierite as the main component. The binding material made of the material in which the mullite particles as the reinforcing particles are dispersed in cordierite excels in the following two points compared to the material in which cordierite is contained as the main component. As the first point, such binding material has an advantage that a value obtained by dividing a value of the bending strength by a value of the Young's modulus (bending strength/Young's modulus) is large. A breakdown strain increases, and a heat stress breakdown does not easily occur. As the second point, such binding material has an advantage that a heat capacity per volume is large. Therefore, the temperature does not easily rise, and the heat stress is not easily generated. The blend ratio of the mullite particles can be obtained by a method similar to the method of measuring the mass ratio of the binding material to the total mass of the aggregates and the binding material. That is, first, an X-ray diffraction pattern of a material constituting the partition walls is obtained by using an X-ray diffracting device. Next, the mass ratio (the blend ratio) of the mullite particles in the binding material is calculated by simple quantitative analysis.

The binding material binds the aggregates to one another in the state where the pores are formed so that the porosity of the partition walls is from 35 to 70%. When the porosity of the partition walls is smaller than 35%, an initial pressure loss of the honeycomb filter increases sometimes. Moreover, when the porosity of the partition walls is in excess of 70%, the strength of the honeycomb filter deteriorates sometimes. The porosity of the partition walls is preferably from 38 to 70%, and further preferably from 38 to 67%. The porosity can be measured by a method conformable to JIS R 1655. Specifically, the porosity is calculated from a total pore volume ($cm^3/g$) by mercury porosimetry, and an apparent density ($g/cm^3$) measured by Archimedes method. In the calculation of the porosity, the following equation (1) is used.

Porosity(%)=100×the total pore volume/{(1/the apparent density)+the total pore volume} (1)

In the partition walls of the honeycomb structure for use in the honeycomb filter of the present embodiment, a thermal expansion coefficient at 40 to 800° C. is $4.2\times10^{-6}$ 1/K or less. The thermal expansion coefficient of the partition walls at 40 to 800° C. is preferably $4.0\times10^{-6}$ 1/K or less, and further preferably $3.8\times10^{-6}$ 1/K or less. There is not any special restriction on a lower limit value of the thermal expansion coefficient of the partition walls, however the value is substantially about $3.6\times10^{-6}$ 1/K. When the thermal expansion coefficient at 40 to 800° C. is in excess of $4.2\times10^{-6}$ 1/K, the heat stress is easily generated, and the partition walls easily break down due to heat during the burning of the soot deposited in the filter. The thermal expansion coefficient can be obtained by measuring an average linear thermal expansion coefficient (the thermal expansion coefficient) at 40 to 800° C. by a method conformable to JIS R 1618.

Furthermore, in the honeycomb filter of the present embodiment, the relation between the stress applied to the partition wall material and the displacement of the partition wall material to which the stress is applied at 900° C. indicates the following relation. As shown in FIG. 4, first, the relation between the stress and the displacement is normalized by the maximum value of the stress applied to the partition wall material. In the graph shown in FIG. 4 the abscissa indicates the displacement (mm), and the ordinate indicates the normalized stress value. The normalization of the relation between the stress and the displacement by the maximum value of the stress will simply be referred to as "the normalization" sometimes. In the honeycomb filter of the present embodiment, the percentage of the plastic deformation displacement $u2$ in the total displacement $u1$ at the normalized stress value of 0.9 is in a range of 0.3 to 10%. "The normalization of the value of the stress applied to the partition wall material by the maximum value of the stress" indicates that the value of the stress applied to the partition wall material is divided by the maximum value of the stress so that the normalized stress value is 1.0 at maximum, and the normalized stress value is 0 at minimum. That is, "the normalized stress value of 0.9" is a stress value corresponding to a value which is 0.9 time the maximum stress value, when the relation is normalized so that the normalized stress value is 1.0 at maximum. Hereinafter, "the percentage of the plastic deformation displacement $u2$ in the total displacement $u1$ at the normalized stress value of 0.9" will simply be referred to as "the percentage of the plastic deformation displacement $u2$" sometimes. Moreover, "the normalized stress value" will be referred to simply as "the stress value" sometimes.

Moreover, as shown in FIG. 4, the total displacement $u1$ at the stress value of 0.9 is a displacement amount of the honeycomb structure from a state of a stress value of 0 to a state of the stress value of 0.9 at 900° C. Moreover, the plastic deformation displacement $u2$ can be obtained as follows. First, in the graph indicating the relation between the stress and the displacement as shown in FIG. 4, a straight line connecting two points of the stress value of 0 and a stress value of 0.5 is drawn. An amount of a difference between the displacement of this straight line at the stress value of 0.9 and the total displacement $u1$ (the displacement amount) is the plastic deformation displacement $u2$.

The relation between the stress applied to the partition wall material and the displacement of the partition wall material to which the stress is applied at 900° C. can be obtained as follows. First, a partition wall material test piece for measuring the bending strength is prepared from the honeycomb structure constituting the honeycomb filter. The partition wall material test piece (hereinafter also referred to simply as "the test piece") is prepared so that the cell extending direction of the honeycomb structure is the longitudinal direction. Moreover, the test piece has a vertical size of 0.3 mm, a horizontal size of 4 mm, and a length of 40 mm. In a bending test carried out in conformity to JIS R 1601 by use of the test piece prepared in this manner, a load and a displacement are recorded, and the stress generated in the partition wall material is calculated from the load, the test piece size, and a span distance of 4-point bending, to prepare a stress-displacement diagram. From the obtained stress-displacement diagram, the total displacement $u1$ of the partition wall material can be obtained. Therefore, in the present invention, "the stress applied to the partition wall material" is "the stress generated in the partition wall material" which is calculated from the load, the test piece size, and the span distance of the 4-point bending as described above. Moreover, when the partition wall material is plastically deforming, there is present a point where the stress decreases while the displacement is continuously applied to the partition wall material due to the deformation of the partition wall material. That the stress applied to the partition wall material has the maximum value, and the maximum value of this stress is "the maximum value of the stress applied to the partition wall material" in the present invention.

When the percentage of the plastic deformation displacement $u2$ is in excess of 10%, the partition wall material is excessively noticeably deformed plastically. Therefore, due to a plurality of times of repetition of temperature history, the stress generated in a plastically deformed portion itself excessively increases sometimes. In particular, the stress generated in the plastically deformed portion itself excessively increases at low temperatures. The above-mentioned "stress generated in the plastically deformed portion itself" is a stress due to the plastic deformation. When the percentage of the plastic deformation displacement $u2$ is smaller than 0.3%, the plastic deformation of the partition wall material is excessively small. Therefore, a sufficient stress alleviating effect cannot be obtained. The percentage of the plastic deformation displacement $u2$ is preferably from 0.3 to 5%, and further preferably from 0.3 to 3%. The suitable percentage of the plastic deformation displacement $u2$ can be obtained by suitably controlling crystallization of cordierite constituting the binding material. The crystallization of cordierite can be controlled by selecting the particle diameter of each particle of the cordierite forming raw material, and adjusting the firing temperature at the firing of the binding material. Moreover, the crystallization of cordierite can be controlled in accordance with firing conditions of the binding material. An example of the control in accordance with the firing conditions of the binding material is the following method. The binding material is fired at a low oxygen concentration in a reducing atmosphere, and then a heat treatment is carried out in an oxidizing atmosphere. In this case, the temperature and time of the firing and heat treatment in the oxidizing atmospheres are adjusted.

In the honeycomb filter of the present embodiment, a bending strength of the partition wall material is 6.5 MPa or more, and the value obtained by dividing the value of the bending strength by the value of the Young's modulus (bending strength/Young's modulus) is preferably $1.4 \times 10^{-3}$ or more. According to such a constitution, a heat stress decreasing effect is easily exerted. The bending strength of the partition wall material can be measured by the following method. First, a test piece for measuring the bending strength is prepared from the honeycomb structure constituting the honeycomb filter. The test piece is prepared so that the cell extending direction of the honeycomb structure is the longitudinal direction. The test piece has a vertical size of 0.3 mm, a horizontal size of 4 mm, and a length of 40 mm. In the bending test carried out in conformity to JIS R 1601 by use of the test piece prepared in this manner, the bending strength is calculated. Moreover, the Young's modulus can be obtained by the following method. From the above "bending strength" measurement result, "a stress-strain curve" is prepared, and a tilt of the "stress-strain curve" is calculated. The obtained "tilt of the stress-strain curve" is the Young's modulus.

The bending strength of the partition wall material is preferably 5 MPa or more, and further preferably 7 MPa or more. Moreover, the value obtained by dividing the value of the bending strength by the value of the Young's modulus is preferably $0.8 \times 10^{-3}$ or more, and further preferably $1.5 \times 10^{-3}$ or more. The upper limit value of the value obtained by dividing the value of the bending strength by the value of the Young's modulus is $3.5 \times 10^{-3}$.

Moreover, a specific heat capacity of the honeycomb structure constituting the honeycomb filter is preferably from 1.9 to 2.5 J/(cm$^3$·K), and further preferably from 2.0 to 2.5 J/(cm$^3$·K). The specific heat capacity of the honeycomb structure can be obtained by the following method. First, a disc-like measurement sample having a diameter of 0.5 mm and a thickness of 1.0 mm is cut out of the honeycomb structure. Specific heat at room temperature is measured by a method conformable to JIS R 1611 by use of the obtained measurement sample. Furthermore, an apparent density of the measurement sample is measured by Archimedes method. Then, a product of the obtained value of the specific heat and the apparent density is the specific heat capacity (J/(cm$^3$·K)).

An average pore diameter of the partition walls is preferably from 5 to 30 µm, further preferably from 7 to 30 µm, and especially preferably from 7 to 25 µm. When the average pore diameter is smaller than 5 µm, the initial pressure loss of the honeycomb filter increases sometimes. When the average pore diameter is larger than 30 µm, the strength of the honeycomb filter deteriorates sometimes. The average pore diameter is a value measured by mercury porosimetry conformable to JIS R 1655.

In the honeycomb filter of the present embodiment, a cell density of the honeycomb structure is preferably 23 cells/cm$^2$ or more and 60 cells/cm$^2$ or less. When the cell density is smaller than 23 cells/cm$^2$, the strength of the honeycomb filter deteriorates sometimes. When the cell density is larger than 60 cells/cm$^2$, a cross sectional area of each cell (the area of the cell in a cross section perpendicular to the cell extending direction) decreases, and hence the pressure loss increases. The cell density of the honeycomb structure is further preferably 30 cells/cm$^2$ or more and 47 cells/cm$^2$ or less.

A thickness of each of the partition walls is preferably 100 µm or more and 400 µm or less. When the thickness of the partition wall is smaller than 100 µm, a temperature of the honeycomb filter becomes excessively high at the burning and removing of the deposited soot. Even when the above-mentioned heat stress decreasing effect is obtained, the partition walls might break due to the heat stress. When the thickness of the partition wall is larger than 400 µm, the initial pressure loss of the honeycomb filter increases sometimes. The thickness of the partition wall is further preferably 120 µm or more, and especially preferably 150 µm or more. Moreover, the thickness of the partition wall is further preferably 380 µm or less, and especially preferably 350 µm or less.

There is not any special restriction on a cell shape (an open area shape of the cell in the cross section perpendicular to the cell extending direction). Examples of the shape include a triangular shape, a quadrangular shape, a hexagonal shape, and an octagonal shape. The quadrangular shape is preferably a square shape or a rectangular shape, and more preferably the square shape.

Moreover, when the honeycomb filter is the honeycomb filter having segment structure, there is not any special restriction on the number of the honeycomb segments included in the honeycomb filter. For example, the honeycomb filter 200 shown in FIG. 5 and FIG. 6 include 16 honeycomb segments 26. In the honeycomb filter 200, four honeycomb segments 26 are complete segments, and the complete segments are arranged in an arrangement of two vertical segments×two horizontal segments in the cross section perpendicular to the extending direction of the cells 22. Furthermore, the 12 honeycomb segments 26 positioned in the outer periphery of the above four complete segments (the outer periphery in the cross section perpendicular to the extending direction of the cells 22) are incomplete segments.

There is not any special restriction on a length from the inflow end surface to the outflow end surface of the honeycomb filter of the present embodiment. The length from the inflow end surface to the outflow end surface of the honeycomb filter is preferably from 50 to 600 mm, and further preferably from 100 to 400 mm.

(1-2) Plugged Portion:

As shown in FIG. 1 to FIG. 3, the plugged portions 5 are arranged in the ends of the cells 2 formed in the honeycomb structure 4 on the inflow end surface 11 side or the outflow end surface 12 side, to plug one of the ends of each of the cells 2. The plugged portion 5 plugs the one end of each of the cells 2, so that the honeycomb structure 4 having the porous partition walls 1 serves as a filter to purify a fluid such as the exhaust gas.

There is not any special restriction on the arrangement of the plugged portions 5, as long as the honeycomb structure 4 can function as the filter when the one end of each of the cells 2 is plugged. That is, there is not any special restriction on the arrangement of the cells provided with the plugged portions on the inflow end surface side (the first cells) and the cells provided with the plugged portions on the outflow end surface side (the second cells). However, from the viewpoint that the particulate matters in the fluid are suitably collected by the partition walls, the first cells and the second cells are preferably alternately arranged via the partition walls. Part of the first cells or part of the second cells may be arranged to gather in one portion of the end surface of the honeycomb segment.

There is not any special restriction on a material of the plugged portions, but a ceramic material is preferably used, and the example of the preferable material of the partition walls can suitably be used.

(1-3) Honeycomb Filter having Segment Structure:

The honeycomb filter 200 shown in FIG. 5 and FIG. 6 include the honeycomb structure 24 in which the side surfaces of the plurality of honeycomb segments 26 are bonded to one another by the bonding layers 27. The bonding layers 27 in the honeycomb filter 200 having segment structure are made of a bonding material for bonding and integrating the plurality of honeycomb segments 26.

Various conditions such as a partition wall thickness, a porosity and an average pore diameter of the honeycomb segment 26 are preferably similar to those of the honeycomb structure 4 of the honeycomb filter 100 described hitherto with reference to FIG. 1 to FIG. 3.

There is not any special restriction on a material of the bonding layers. An example of the bonding material forming the bonding layers is preferably a slurry formed by adding additives such as an organic binder, resin balloon and a dispersant to inorganic raw materials such as an inorganic fiber, colloidal silica, clay and SiC particles, adding water to the obtained material and kneading the material. By use of such a material, the heat stress generated in the honeycomb filter can suitably be decreased. Moreover, by use of the material, the bonding layers serve as a buffer material when a load is applied to the honeycomb filter.

A thickness of each of the bonding layers is suitably determined in accordance with the shape of each of the honeycomb segments, the arrangement of the plurality of honeycomb segments, and the like. A space between the honeycomb segments in the plurality of honeycomb segments is preferably from 0.5 to 3 mm, and further preferably from 0.5 to 2.5 mm. When the space between the honeycomb segments is in excess of 3 mm, the thickness of the bonding layer excessively increases, and the initial pressure loss of the honeycomb filter increases sometimes.

Moreover, the Young's modulus of the bonding layer is preferably 1% or less of the Young's modulus of the partition wall material constituting the partition walls.

The honeycomb filter having segment structure is preferably obtained by bonding the respective honeycomb segments by the bonding material to prepare a bonded honeycomb segment assembly, and cutting the outer peripheral portion of the bonded honeycomb segment assembly into a desirable shape. For example, the outer peripheral portion of the bonded honeycomb segment assembly is preferably ground to cut the honeycomb segments positioned in the outermost periphery so that a shape of a cross section vertical to the cell extending direction is a circular shape, an elliptic shape, or a race track shape. The outermost periphery of the bonded honeycomb segment assembly is preferably provided with an outer periphery coating layer. An example of this outer periphery coating layer is preferably an outer periphery coating layer formed by using a material similar to that of the bonding layers. An example of the material of the outer periphery coating layer is a slurry formed by adding additives such as an organic binder, resin balloon and a dispersant to inorganic raw materials such as an inorganic fiber, colloidal silica, clay and SiC particles, adding water to the obtained material and kneading the material.

(2) Manufacturing Method of Honeycomb Filter:

Next, a method of manufacturing the honeycomb filter of the present embodiment will be described. Hereinafter, as to the method of manufacturing the honeycomb filter of the present embodiment, a method of manufacturing the honeycomb filter having segment structure will be described as an example.

First, silicon carbide powder as the aggregates and binding material producing raw material powder from which the binding material is produced by firing are mixed, and a binder, a surfactant, a pore former, water and the like are added if necessary, to prepare a forming raw material. An example of the binding material producing raw material is a material from which "the mullite particles as the reinforcing particles" and "cordierite as the binding material" are produced by the firing. Moreover, in place of the binding material producing raw material powder, mullite powder and the cordierite forming raw material may be mixed. The cordierite forming raw material means the raw material from which the cordierite crystals are produced by the firing. An example of the binding material producing raw material powder is mixed powder of 35.9 mass % of talc, 44.3 mass % of aluminum hydroxide, and 19.8 mass % of silica powder. It is to be noted that a type of the raw material powder included in the binding material producing raw material powder and an amount of the powder to be blended are not limited to those of the above mixed powder. Moreover, a binding material producing raw material may be a material from which "cordierite as the binding material" is produced by the firing. Furthermore, an example in which the silicon carbide powder is used as the aggregate will be described, but silicon nitride powder may be used.

An average particle diameter of the silicon carbide powder as the aggregate is preferably from 5 to 100 μm, and further preferably from 10 to 40 μm. The average particle diameter is a value measured by the laser diffraction method. When the silicon nitride powder is used as the aggregate, the silicon nitride powder preferably has an average particle diameter of about the same degree as in the silicon carbide powder.

Examples of the binder to be added to the forming raw material include organic binders such as methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. An amount of the binder to be added is preferably from 2 to 10 mass % of the whole forming raw material.

As the surfactant to be added to the forming raw material, ethylene glycol, dextrin, fatty acid soap, polyalcohol or the like can be used. One of these surfactants may be used alone, or a combination of two or more of the surfactants may be used. An amount of the surfactant to be added is preferably 2 mass % or less of the whole forming raw material.

There is not any special restriction on the pore former, as long as pores are formed after the firing, and examples of the pore former include graphite, starch, resin balloon, a water-absorbing resin, and silica gel. An amount of the pore former to be added is preferably 10 mass % or less of the whole forming raw material. An average particle diameter of the pore former is preferably from 10 to 30 μm. When the average particle diameter is smaller than 10 μm, the pores cannot sufficiently be formed sometimes. When the average particle diameter is larger than 30 μm, the die is clogged sometimes at formation. The average particle diameter of the pore former is a value measured by the laser diffraction method. It is to be noted that when the pore former is the water-absorbing resin, the average particle diameter is a value after the water-absorbing resin has absorbed water.

An amount of the water to be added is suitably regulated to obtain a hardness of a kneaded material so that the kneaded material is easily formed, but the amount is preferably from 20 to 80 mass % of the whole forming raw material.

Next, the forming raw material is kneaded to form a kneaded material. There is not any special restriction on a method of kneading the forming raw material to form the kneaded material, and an example of the method is a method using a kneader, a vacuum clay kneader or the like.

Next, the kneaded material is extruded to obtain a formed honeycomb body. In the extrusion forming, a die having desirable whole shape, cell shape, partition wall thickness, cell density and the like is preferably used. A material of the die is preferably a hard metal which does not easily wear down. The formed honeycomb body is a structure having porous partition walls with which a plurality of cells are defined and formed to become through channels of a fluid, and an outer wall positioned in an outermost periphery. The partition wall thickness, cell density, outer wall thickness and the like of the formed honeycomb body can suitably be determined in accordance with a constitution of the honeycomb structure to be prepared, in consideration of shrinkages at drying and firing. It is to be noted that when the honeycomb structure 4 for use in the honeycomb filter 100 shown in FIG. 1 to FIG. 3 is prepared, the formed honeycomb body is prepared in accordance with a shape of the honeycomb structure 4. That is, the honeycomb structure 4 can be obtained by firing the obtained formed honeycomb body. On the other hand, when the honeycomb filter 200 shown in FIG. 5 and FIG. 6 is manufactured, the extruded formed honeycomb body becomes a honeycomb segment 26. Therefore, when the honeycomb filter 200 shown in FIG. 5 and FIG. 6 is manufactured, a plurality of formed honeycomb bodies are formed by the extrusion. Then, the obtained formed honeycomb bodies are fired to obtain the plurality of honeycomb segments 26, and the plurality of obtained honeycomb segments 26 are bonded by the bonding layers 27 to prepare the honeycomb structure 24.

Next, the obtained formed honeycomb body is preferably dried prior to the firing. There is not any special restriction on a drying method, and examples of the drying method include electromagnetic heating systems such as microwave heating drying and high-frequency dielectric heating drying, and external heating systems such as hot air drying and superheat vapor drying. In these examples, it is preferable that a predetermined amount of water content is dried by the electromagnetic heating system, and then the remaining water content is dried by the external heating system, because the whole formed body can rapidly and evenly be dried so that any cracks are not generated. As drying conditions, it is preferable that the water content of 30 to 99 mass % of a water content prior to the drying is removed by the electromagnetic heating system, and then the water content is decreased down to 3 mass % or less by the external heating system. The electromagnetic heating system is preferably the dielectric heating drying, and the external heating system is preferably the hot air drying.

Next, when the length of the formed honeycomb body in the cell extending direction is not a desirable length, both end surfaces (both ends) of the formed honeycomb body are preferably cut so as to achieve the desirable length. There is not any special restriction on a cutting method, but an example of the cutting method is a method using a disc saw cutter or the like.

Next, the formed honeycomb body is fired to prepare the honeycomb segment. Prior to the firing, calcination is preferably performed to remove the binder and the like. The calcination is preferably performed at 200 to 600° C. in the atmospheric air for 0.5 to 20 hours. At the firing, heating is preferably performed at 1400 to 1500° C. in a non-oxidizing atmosphere of nitrogen, argon or the like (an oxygen partial pressure is $10^{-4}$ atm or less) under ordinary pressure for one to 20 hours. Moreover, after the firing, an oxidation treatment may be performed at 1100 to 1400° C. in the atmospheric air (water vapor may be included) for one to 20 hours, to enhance a durability. It is to be noted that the calcinations and firing can be performed by using, for example, an electric furnace, a gas furnace or the like.

Next, a plugging material is applied to the open frontal areas of the predetermined cells (the first cells) of each obtained honeycomb segment in the inflow end surface and the open frontal areas of the remaining cells (the second cells) in the outflow end surface of each honeycomb segment, to form the plugged portions. It is to be noted that, in case the formed body for the honeycomb structure 4 shown in FIG. 1 to FIG. 3 is prepared at the extrusion forming, the honeycomb filter 100 is completed by forming the plugged portions.

When the plugging material is filled into the honeycomb segment, the plugging material is first filled into the predetermined cells (e.g., the first cell from one end surface (e.g., the inflow end surface) side of the honeycomb segment. Afterward, the plugging material is filled into the remaining cells (e.g., the second cells) from the other end surface (e.g., the outflow end surface) side. An example of a method of filling the plugging material is preferably a method having a masking step and a press-in step as follows. The masking step is a step of attaching a sheet to the one end surface (e.g., the inflow end surface) of the honeycomb segment, and making holes in portions of the sheet which overlap with "cells to be provided with the plugged portions". The press-in step is a step of pressing "an end of the honeycomb segment to which the sheet has been attached" into a container which contains the plugging material, and pressing the plugging material into the cells of the honeycomb segment. When the plugging material is pressed into the cells of the honeycomb segment, the plugging material passes through the holes made in the sheet, and is filled into the only cells that communicate with the holes made in the sheet. A method of filling the plugging material into the cells from the other end surface (e.g., the outflow end surface) of the honeycomb segment is preferably similar to the method of filling the plugging material into the cells from the one end surface of the honeycomb segment. Moreover, the plugging material may simultaneously be filled into the cells from both the end surfaces of the honeycomb segment.

Next, the plugging material filled into the cells of the honeycomb segments is preferably dried, to form the plugged portions, thereby obtaining the plugged honeycomb segments. Moreover, for the purpose of more securely fixing the plugging material, the plugging material may be fired after the drying. Furthermore, the plugging material may be filled into each formed honeycomb segment body before or after the drying, and the plugging material may be fired together with the formed honeycomb segment body before or after the drying.

Next, the respective obtained honeycomb segments are bonded by the bonding material, so that the honeycomb filter 200 as shown in FIG. 5 and FIG. 6 can be obtained. An example of the bonding material is a slurry obtained by adding additives such as an organic binder, resin balloon and dispersant to inorganic raw materials such as an inorganic fiber, colloidal silica, clay and SiC particles, adding water to the obtained material, and kneading the material.

Moreover, after bonding the plurality of honeycomb segments by the bonding material, the outer peripheral portion of the obtained bonded honeycomb segment assembly is preferably cut and formed into the desirable shape. Moreover, after bonding the honeycomb segments and cutting the outer peripheral portion of the bonded honeycomb segment assembly, an outer periphery coating material is preferably disposed in the outer peripheral portion, to prepare the honeycomb filter. This outer periphery coating material forms the outer periphery coating layer of the honeycomb filter. With the result that such an outer periphery coating layer is disposed, an advantage such as enhancement of circularity of the honeycomb filter can be obtained. As the outer periphery coating material, the slurry prepared as the bonding material can be used.

According to such a constitution, the honeycomb filter of the present embodiment can be manufactured. However, the manufacturing method of the honeycomb filter of the present embodiment is not limited to the above-mentioned manufacturing method.

EXAMPLES

Hereinafter, the honeycomb filter of the present invention will further specifically be described with respect to examples, but the present invention is not limited to these examples.

Example 1

Silicon carbide (SIC) powder as an aggregate and binding material producing raw material powder were mixed at a ratio of 7:3 (a volume ratio) to prepare "mixed powder". As the binding material producing powder, powder containing 45.1 vol % of talc, 32.8 vol % of kaolin and 22.1 vol % of aluminum hydroxide was used. Then, hydroxypropyl methylcellulose as a binder and starch and a water-absorbing resin as pore formers were added to the above "mixed powder", and water was also added, to prepare a forming raw material. A content of the binder was 7 parts by mass in 100 parts by mass of the mixed powder. A content of the pore former was 10 parts by mass in 100 parts by mass of the mixed powder. A content of the water was 70 parts by mass in 100 parts by mass of the mixed powder.

Moreover, an average particle diameter of the silicon carbide powder as the aggregate was 22 μm. Furthermore, an average particle diameter of the pore former was 22 μm. Additionally, in the binding material producing powder, an average particle diameter of talc was 3 μm, an average particle diameter of kaolin was 1 μm, and an average particle diameter of aluminum hydroxide was 0.2 μm. The average particle diameters of the silicon carbide powder, the binding material producing powder of talc, kaolin or aluminum hydroxide and the pore former were values measured by a laser diffraction method. A blend prescription of the above mixed powder is shown in Table 1. The blend ratios (vol %) of the partition wall material are indicated in the row of "partition wall material" of Table 1. The blend prescription of "binding material producing raw material powder" is indicated in the row of "binding material" of Table 1.

TABLE 1

| | | | Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Partition wall material | Aggregate (silicon carbide powder) | Blend ratio (vol %) | 70 | 70 | 70 | 70 | 70 | 70 | 70 | 70 | 70 | 70 | 70 |
| | | Ave. particle dia. (µm) | 22 | 22 | 22 | 22 | 18 | 18 | 22 | 22 | 22 | 22 | 22 |
| | Binding material | Main component crystals of binding material | Cordierite + mullite | Cordierite + mullite | Cordierite + mullite | Cordierite + mullite | Cordierite + mullite | Cordierite + mullite | Cordierite + mullite | Cordierite + mullite | Cordierite + mullite | Cordierite + mullite | Cordierite |
| | | Blend ratio (vol %) | 30 | 30 | 30 | 30 | 30 | 30 | 30 | 30 | 20 | 35 | 30 |
| | | Talc Blend ratio (vol %) | 45.1 | 45.1 | 45.1 | 45.1 | 45.1 | 45.1 | 45.1 | 45.1 | 45.1 | 45.1 | 32.8 |
| | | Ave. particle dia. (µm) | 3 | 3 | 3 | 3 | 3 | 3 | 3 | 2 | 2 | 2 | 3 |
| | | Kaolin Blend ratio (vol %) | 32.8 | 32.8 | 32.8 | 32.8 | 32.8 | 32.8 | 32.8 | 32.8 | 32.8 | 32.8 | 0 |
| | | Ave. particle dia. (µm) | 1 | 1 | 1 | 1 | 1 | 1 | 1 | 1 | 1 | 1 | — |
| | | Silica Blend ratio (vol %) | 0 | 0 | 0 | 0 | 0 | 0 | 0 | 0 | 0 | 0 | 22.2 |
| | | Ave. particle dia. (µm) | — | — | — | — | — | — | — | — | — | — | 1 |
| | | Aluminum hydroxide Blend ratio (vol %) | 22.1 | 22.1 | 22.1 | 22.1 | 22.1 | 22.1 | 22.1 | 22.1 | 22.1 | 22.1 | 45.1 |
| | | Ave. particle dia. (µm) | 0.2 | 0.4 | 0.5 | 0.5 | 0.5 | 0.4 | 0.2 | 0.2 | 0.2 | 0.2 | 0.4 |
| | Pore former | Amount to be added (parts by mass) | 10 | 10 | 10 | 2 | 2 | 2 | 10 | 10 | 10 | 10 | 10 |
| | | Ave. particle dia. (µm) | 22 | 22 | 22 | 22 | 20 | 20 | 22 | 22 | 22 | 22 | 22 |
| | Firing temp. (° C.) (Ar atmosphere) | | 1420 | 1450 | 1470 | 1420 | 1450 | 1470 | 1380 | 1400 | 1400 | 1400 | 1450 |
| | Oxidizing atmosphere heat treatment (° C.) | | None | None | None | None | None | None | 1430 | 1450 | 1450 | 1450 | None |
| | Partition wall porosity (%) | | 65 | 65 | 65 | 40 | 40 | 40 | 65 | 65 | 65 | 65 | 65 |
| | Partition wall ave. pore dia. (µm) | | 20 | 20 | 20 | 15 | 15 | 15 | 20 | 20 | 20 | 20 | 20 |
| | Percentage of plastic deformation displacement in total displacement at normalized stress value of 0.9 at 900° C. (%) | | 8 | 3 | 0.5 | 7 | 3 | 0.6 | 3 | 2.5 | 2.5 | 2.5 | 3 |
| Honeycomb filter shape | Partition wall thickness (mm) | | 305 | 305 | 305 | 305 | 305 | 305 | 305 | 305 | 305 | 305 | 305 |
| | Cell density (cells/cm$^2$) | | 46.5 | 46.5 | 46.5 | 46.5 | 46.5 | 46.5 | 46.5 | 46.5 | 46.5 | 46.5 | 46.5 |
| | Segment size (mm) | | 35 | 35 | 35 | 35 | 35 | 35 | 35 | 35 | 35 | 35 | 35 |
| | Dia. (mm) | | 144 | 144 | 144 | 144 | 144 | 144 | 144 | 144 | 144 | 144 | 144 |
| | Length (mm) | | 152 | 152 | 152 | 152 | 152 | 152 | 152 | 152 | 152 | 152 | 152 |
| | Max. amount of deposited soot (g/L) | | 10 | 12.5 | 11 | 10.5 | 13 | 12 | 12 | 12.5 | 11.5 | 12 | 11.8 |

Next, the forming raw material was mixed and kneaded to prepare a columnar kneaded material. Then, the obtained columnar kneaded material was formed into a honeycomb shape by use of an extrusion forming machine, to obtain a formed honeycomb body. The obtained formed honeycomb body was dielectrically heated and dried, and then dried at 120° C. for two hours by use of a hot air drier, to obtain a dried honeycomb body. In Example 1, to prepare a honeycomb filter having segment structure, 16 dried honeycomb bodies were prepared.

Next, a plugging material was applied to one open frontal area of each cell of the dried honeycomb body, to obtain the plugged dried honeycomb body. Specifically, the plugging material was applied by filling the plugging material into the cells of the dried honeycomb body as follows. First, the plugging material was filled into predetermined cells (e.g., first cells) from one end surface (e.g., an inflow end surface) side of a honeycomb segment. Afterward, the plugging material was filled into the remaining cells (e.g., second cells) from the other end surface (e.g., an outflow end surface) side. The plugging material was filled by a masking step and a press-in step as follows. The masking step was a step of attaching a sheet to the one end surface of the honeycomb segment, and making holes in portions of the sheet which overlapped with "cells to be provided with plugged portions". The press-in step was a step of pressing "an end of the honeycomb segment to which the sheet was attached" into a container containing the plugging material, and pressing the plugging material into the cells of the honeycomb segment.

Next, each obtained plugged dried honeycomb body was degreased at 550° C. in the atmospheric air for three hours, and then fired at about 1420° C. in an Ar inert atmosphere for two hours, to obtain the fired honeycomb body. The obtained fired honeycomb body became the honeycomb segment provided with the plugged portions. The firing temperature is indicated in the row of "firing temp. (° C.) (Ar atmosphere)" of Table 1. Moreover, the temperature of an oxidizing atmosphere heat treatment, when the heat treatment was performed in the oxidizing atmosphere in a firing step is indicated in the row of "oxidizing atmosphere heat treatment (° C.)" of Table 1. In Example 1, the oxidizing atmosphere heat treatment was not carried out, and hence "none" is indicated in the row of "oxidizing atmosphere heat treatment (° C.)".

The thickness of each partition wall of the obtained honeycomb segment (the honeycomb segment provided with the plugged portions) was 305 μm, and the cell density was 46.5 cells/cm². Moreover, an end surface of the honeycomb segment had a quadrangular shape with one side (indicated as segment size in Table 1) of 35 mm, and a length of the honeycomb segment in a cell extending direction was 152 mm. In the row of "honeycomb filter shape" in Table 1, "the partition wall thickness", "the cell density" and "the segment size" are indicated.

Moreover, the partition walls of each obtained honeycomb segment were partition walls including aggregates of silicon carbide powder, and a binding material which bound the aggregates to one another. The binding material was a composite binding material in which mullite particles as reinforcing particles were dispersed in cordierite. When the binding material of the partition walls of the honeycomb filter is the composite binding material, "cordierite mullite" is indicated in the row of "main component crystals of the binding material" of Table 1. The "content ratio of mullite" in the binding material was 0.5 mass %. Moreover, a mass ratio of the binding material to a total mass of the aggregates and the binding material was 29.9 mass %. The mass ratio of the binding material to the total mass of the aggregates and the binding material was obtained by the following method. First, an X-ray diffraction pattern of the material constituting the partition walls was obtained by using an X-ray diffracting device. As the X-ray diffracting device, a rotating anticathode type X-ray diffracting device ("RINT (trade name)" manufactured by Rigaku Denki) was used. Conditions of X-ray diffraction measurement were CuKα ray source, 50 kV, 300 mA, and 2θ=10 to 60°. Then, the mass ratio of each constituent crystal phase was calculated by simple quantitative analysis. In the simple quantitative analysis, obtained X-ray diffraction data was analyzed by using a reference intensity ratio (RIR) process, to determine a quantity of each component. The X-ray diffracting data was analyzed by using "X-ray data analysis software JADE7 (trade name)" manufactured by MDI Co. Moreover, the content ratio of mullite was obtained by the same method as the method of obtaining the mass ratio of the binding material to the total mass of the aggregates and the binding material.

A slurry-like bonding material was applied to an outer peripheral surface of each honeycomb segment provided with the plugged portions, and the plurality of segments were assembled to obtain a predetermined solid shape, and heated and dried while pressing the segments in this assembled state. Consequently, the plurality of honeycomb segments were bonded to prepare a bonded assembly. Afterward, the bonded assembly was subjected to grind processing, and an outer peripheral surface of the bonded assembly was coated with an outer periphery coating material, then the bonded assembly was heated and dried. The same material was used in the bonding material and the outer periphery coating material with use of a material made of silicon carbide particles and silica. In consequence, the honeycomb filter of Example 1 was prepared. The honeycomb filter of Example 1 had a cylindrical shape having an end surface diameter of 144 mm and a length of 152 mm. The "diameter" and "length" of the honeycomb filter are indicated in the row of "honeycomb filter shape" of Table 1.

As to the obtained honeycomb filter of Example 1, "partition wall porosity", "partition wall average pore diameter" and "percentage of a plastic deformation displacement in a total displacement at a normalized stress value of 0.9 at 900° C. (%)" were obtained by the following methods. The results are shown in Table 1. Moreover, as to the obtained honeycomb filter, "maximum amount of deposited soot (g/L)" was measured by the following method. The results are shown in Table 1.

[Porosity (%) of Partition Walls]

The porosity of the partition walls was measured by a method conformable to JIS R 1655. Specifically, the porosity was calculated from a total pore volume (cm³/g) by mercury porosimetry, and an apparent density (g/cm³) measured by Archimedes method by use of the following equation (2).

$$\text{Porosity}(\%) = 100 \times \text{the total pore volume}/\{(1/\text{the apparent density}) + \text{the total pore volume}\} \quad (2)$$

[Average Pore Diameter (μm) of Partition Walls]

The average pore diameter was measured by mercury porosimetry conformable to JIS R 1655.

[Percentage (%) of Plastic Deformation Displacement in Total Displacement at Normalized Stress Value of 0.9 at 900° C.]

First, a partition wall material test piece for measuring the bending strength was prepared from a honeycomb structure constituting the honeycomb filter. The partition wall material test piece (hereinafter also referred to simply as "the test piece") was prepared so that the cell extending direction of the honeycomb structure was the longitudinal direction.

Moreover, this test piece had a vertical size of 0.3 mm, a horizontal size of 4 mm, and a length of 40 mm. In a bending test carried out in conformity to JIS R 1601 by use of the test piece prepared in this manner, a load and a displacement were recorded, and a stress generated in the partition wall material was calculated from the load, the test piece size, and a span distance of 4-point bending, to prepare a stress-displacement diagram. From the obtained stress-displacement diagram, a total displacement u1 of the partition wall material was obtained. Also from the measurement result, a value of the stress applied to the partition wall material was normalized by a maximum value of the stress applied to the partition wall material. A graph shown in FIG. 4 was prepared by using the normalized stress value, and a straight line connecting two points of a stress value of 0 and a stress value of 0.5 was drawn. An amount of a difference between the displacement of this straight line at a stress value of 0.9 and the total displacement u1 (a displacement amount) was obtained as a plastic deformation displacement u2. In this way, "the total displacement u1 of the partition wall material" and "the plastic deformation displacement u2" were obtained, and "a percentage of the plastic deformation displacement u2 in the total displacement u1 at the normalized stress value of 0.9" was calculated.

[Maximum Amount of Deposited Soot (g/L)]

First, the honeycomb filter was disposed in an exhaust system of a diesel engine. Next, the diesel engine was started, and the exhaust gas discharged from the diesel engine was allowed to flow through the honeycomb filter, to collect soot in the exhaust gas by the partition walls of the honeycomb filter. In a state where the soot was collected on the partition walls, a regeneration test was carried out to burn and remove the soot. Such a regeneration test was repeatedly carried out by increasing an amount of the soot deposited on the partition walls, and the amount of the deposited soot at a limit where cracks were not generated in the honeycomb filter was obtained. Specifically, it was confirmed whether or not the cracks were generated in the honeycomb filter by a heat stress of the burning heat of the soot, and the amount of the deposited soot at the limit where the cracks were not generated was obtained. It is to be noted that as the amount of the deposited soot increased, the heat generated by the burning of the soot increased. A larger heat stress was generated, and the cracks were easily generated in the honeycomb filter. The maximum amount of the deposited soot at which the cracks are not generated is the maximum amount of the deposited soot (g/L). The maximum amount of the deposited soot (g/L) is indicated by a mass (g) of the soot deposited per volume of 1 L of the honeycomb filter. The maximum amount of the deposited soot is also referred to as "a soot mass limit (SML)" sometimes.

Examples 2 and 3

The procedures of Example 1 were repeated except that the average particle diameters of talc, kaolin and aluminum hydroxide used in binding material producing raw material powder were changed as shown in Table 1, to prepare honeycomb filters.

Comparative Examples 1 to 3

The procedures of Example 1 were repeated except that the average particle diameters of talc, kaolin and aluminum hydroxide used in binding material producing raw material powder were changed as shown in Table 2 and the firing temperature (° C.) was changed as shown in Table 2, to prepare honeycomb filters.

TABLE 2

|  |  |  | Comparative Examples ||||||
|---|---|---|---|---|---|---|---|---|
|  |  |  | 1 | 2 | 3 | 4 | 5 | 6 |
| Partition wall material | Aggregate (silicon carbide powder) | Blend ratio (vol %) | 70 | 70 | 70 | 70 | 70 | 70 |
|  |  | Ave. particle dia. (μm) | 22 | 22 | 22 | 22 | 22 | 22 |
|  | Main component crystals of binding material |  | Cordierite + mullite | Cordierite + mullite | Cordierite + mullite | Cordierite + mullite | Cordierite + mullite | Cordierite + mullite |
|  | Binding material | Blend ratio (vol %) | 30 | 30 | 30 | 30 | 30 | 30 |
|  | Talc | Blend ratio (vol %) | 45.1 | 45.1 | 45.1 | 45.1 | 45.1 | 45.1 |
|  |  | Ave. particle dia. (μm) | 3 | 2 | 2 | 3 | 2 | 2 |
|  | Kaolin | Blend ratio (vol %) | 32.8 | 32.8 | 32.8 | 32.8 | 32.8 | 32.8 |
|  |  | Ave. particle dia. (μm) | 1 | 1 | 1 | 1 | 1 | 1 |
|  | Silica | Blend ratio (vol %) | 0 | 0 | 0 | 0 | 0 | 0 |
|  |  | Ave. particle dia. (μm) | — | — | — | — | — | — |
|  | Aluminum hydroxide | Blend ratio (vol %) | 22.1 | 22.1 | 22.1 | 22.1 | 22.1 | 22.1 |
|  |  | Ave. particle dia. (μm) | 0.2 | 0.2 | 0.5 | 0.2 | 0.2 | 0.5 |
|  | Pore former | Amount to be added (parts by mass) | 10 | 10 | 10 | 2 | 2 | 2 |
|  |  | Ave. particle dia. (μm) | 22 | 22 | 22 | 22 | 22 | 22 |
| Firing temp. (° C.) (Ar atmosphere) ||| 1380 | 1400 | 1580 | 1380 | 1400 | 1580 |
| Oxidizing atmosphere heat treatment (° C.) ||| None | None | None | None | None | None |

TABLE 2-continued

|  |  | Comparative Examples | | | | | |
|---|---|---|---|---|---|---|---|
|  |  | 1 | 2 | 3 | 4 | 5 | 6 |
| | Partition wall porosity (%) | 65 | 65 | 65 | 40 | 40 | 40 |
| | Partition wall ave. pore dia. (μm) | 20 | 20 | 20 | 15 | 15 | 15 |
| | Percentage of plastic deformation displacement in total displacement at normalized stress value of 0.9 at 900° C. (%) | 20 | 15 | 0.1 | 25 | 20 | 0.2 |
| Honeycomb filter shape | Partition wall thickness (mm) | 305 | 305 | 305 | 305 | 305 | 305 |
| | Cell density (cells/cm²) | 46.5 | 46.5 | 46.5 | 46.5 | 46.5 | 46.5 |
| | Segment size (mm) | 35 | 35 | 35 | 35 | 35 | 35 |
| | Dia. (mm) | 144 | 144 | 144 | 144 | 144 | 144 |
| | Length (mm) | 152 | 152 | 152 | 152 | 152 | 152 |
| | Max. amount of deposited soot (g/L) | 6.5 | 7 | 8 | 8.5 | 9 | 8 |

Examples 4 to 6

The procedures of Example 1 were repeated except that the average particle diameters of talc, kaolin and aluminum hydroxide used in binding material producing raw material powder were changed as shown in Table 1 and the amount of the pore former to be added and the average particle diameter of the pore former were changed as shown in Table 1, to prepare honeycomb filters.

Comparative Examples 4 to 6

The procedures of Comparative Examples 1 to 3 were repeated except that the amount of the pore former to be added was changed as shown in Table 2, to prepare honeycomb filters.

Examples 7 and 8

The procedures of Comparative Examples 1 and 2 were repeated except that the plugged dried honeycomb bodies were fired, and then honeycomb segments were obtained by carrying out an oxidation treatment at 1200° C. for four hours, to prepare the honeycomb filters. The temperature the heat treatment in the oxidizing atmosphere is indicated in the row of "oxidizing atmosphere heat treatment (° C.)" of Table 1.

Examples 9 and 10

The procedures of Example 8 were repeated except that the blend ratio (%) of aggregates and a binding material (binding material producing raw material powder) of the partition wall material was changed as shown in Table 1, to prepare the honeycomb filters.

Example 11

In Example 11, as binding material producing raw material powder, powder containing 32.8 volt of talc, 22.2 vol % of silica and 45.1 vol % of aluminum hydroxide was used, to prepare mixed powder. The average particle diameter of talc was 3 μm, the average particle diameter of silica was 1 μm, and the average particle diameter of aluminum hydroxide was 0.4 μm. The honeycomb filter was prepared in the same manner as in Example 1 by use of such mixed powder. Additionally, the firing temperature of the plugged dried honeycomb body was 1450° C. In the honeycomb filter of Example 11, main component crystals of the binding material were made of cordierite.

As to the honeycomb filters of Examples 2 to 11 and Comparative Examples 1 to 6, the procedures of Example 1 were repeated to obtain "partition wall porosity", "partition wall average pore diameter" and "percentage of a plastic deformation displacement in a total displacement at a normalized stress value of 0.9 at 900° C. (%)". The results are shown in Table 1 and Table 2. Moreover, as to the obtained honeycomb filters, "maximum amount of deposited soot (g/L)" was measured. The results are shown in Table 1 and Table 2.

(Results)

As shown in Table 1 and Table 2, each of the honeycomb filters of Examples 1 to 11 was made of the partition wall material including the aggregates of the silicon carbide powder, and the binding material which bound the aggregates to one another in the state where the pores were formed so that the porosity of the partition walls was from 35 to 70%. Moreover, the partition wall material constituting the partition walls contained 20 to 35 mass % of the binding material in the total mass of the aggregates and the binding material. In such honeycomb filters of Examples 1 to 11, the porosity of the partition walls and the thermal expansion coefficient of the partition walls at 40 to 800° C. were in a predetermined range. Therefore, each of the honeycomb filters of Examples 1 to 11 can suitably be used as a honeycomb filter to collect particulate matters from an engine, especially, an engine of a car. Furthermore, in the honeycomb filters of Examples 1 to 11, "percentage of the plastic deformation displacement in the total displacement at the normalized stress value of 0.9 at 900° C." was in a range of 0.3 to 10%. In such honeycomb filters of Examples 1 to 11, the maximum amount of the deposited soot was 10 g/L or more. Thus, even when a large heat stress was generated in each of the honeycomb filters, cracks were not easily generated in the honeycomb filter.

On the other hand, in the honeycomb filters of Comparative Examples 1, 2, 4 and 5, "percentage of the plastic deformation displacement in the total displacement at the normalized stress value of 0.9 at 900° C." was excessively large, and the value of the maximum amount of the deposited soot decreased. It has been considered that in each of the honeycomb filters of Comparative Examples 1, 2, 4 and 5, the plastic deformation of the partition wall material was excessively large, and hence a stress generated in a plastically deformed portion itself excessively increased at low temperatures. Moreover, in the honeycomb filters of Comparative Examples 3 and 6, "percentage of the plastic deformation displacement in the total displacement at the normalized stress value of 0.9 at 900° C." was excessively small, and the value of the maximum amount of the deposited soot decreased. Specifically, in the honeycomb filters of Comparative Examples 3 and 6, the partition wall material was hardly plastically deformed, and it was not possible to obtain a sufficient stress alleviating effect.

INDUSTRIAL APPLICABILITY

A honeycomb filter of the present invention can suitably be utilized as a filter to purify exhaust gases discharged from an internal combustion engine, various combustion devices and the like. The honeycomb filter of the present invention can suitably be utilized as a filter which suitably collects particulate matters included in an exhaust gas discharged from an engine, especially an engine of a car.

DESCRIPTION OF REFERENCE MARKS 1, 21: partition wall, 2, 22: cell, 2a, 22a: first cell, 2b, 22b: second cell, 3, 23: outer wall, 4, 24: honeycomb structure, 5, 25: plugged portion, 11, 31: inflow end surface, 12, 32: outflow end surface, 26: honeycomb segment, 27: bonding layer, 28: outer periphery coating layer, and 100, 200: honeycomb filter.

The invention claimed is:

1. A honeycomb filter comprising:
a tubular honeycomb structure having porous partition walls which define and form a plurality of cells extending from an inflow end surface to an outflow end surface; and
a plurality of plugged portions which plug open frontal areas of the first cells on the side of the inflow end surface among the cells formed in the honeycomb structure, and open frontal areas of the second cells other than the first cells on the side of the outflow end surface,
wherein the partition walls are made of a partition wall material including a plurality of aggregates containing silicon carbide or silicon nitride as a main component, and a binding material which binds the aggregates to one another in a state where pores are formed so that a porosity of the partition was is from 35 to 70%,
the partition wall material contains 15 to 35 mass % of the binding material in a total mass of the aggregates and the binding material,
the binding material is made of a material in which mullite particles as reinforcing particles are dispersed in cordierite,
a thermal expansion coefficient of the partition was at 40 to 800° C. is $4.2 \times 10^{-6}$ 1/K or less, and
when a value of a stress applied to the partition wall material at 900° C. is normalized by the maximum value of the stress applied to the partition wall material, a percentage of a plastic deformation displacement in a total displacement at a normalized stress value of 0.9 is in a range of 0.3 to 10%.

2. A filter to collect fine particles in an exhaust gas discharged from a car, said filter comprising the honeycomb filter according to claim 1.

3. The honeycomb filter according to claim 1, wherein a cell density of the honeycomb structure is 23 cells/cm$^2$ or more and 60 cells/cm$^2$ or less.

4. The honeycomb filter according to claim 2, wherein a cell density of the honeycomb structure is 23 cells/cm$^2$ or more and 60 cells/cm$^2$ or less.

5. The honeycomb filter according to claim 1, wherein a thickness of each of the partition walls of the honeycomb structure is 120 μm or more and 400 μm or less.

6. The honeycomb filter according to claim 2, wherein a thickness of each of the partition walls of the honeycomb structure is 120 μm or more and 400 μm or less.

7. The honeycomb filter according to claim 3, wherein a thickness of each of the partition walls of the honeycomb structure is 120 μm or more and 400 μm or less.

8. The honeycomb filter according to claim 1, wherein a bending strength is 6.5 MPa or more, and a value obtained by dividing a value of the bending strength by a value of Young's modulus (bending strength/Young's modulus) is $1.4 \times 10^{-3}$ or more.

9. The honeycomb filter according to claim 2, wherein a bending strength is 6.5 MPa or more, and a value obtained by dividing a value of the bending strength by a value of Young's modulus (bending strength/Young's modulus) is $1.4 \times 10^{-3}$ or more.

10. The honeycomb filter according to claim 3, wherein a bending strength is 6.5 MPa or more, and a value obtained by dividing a value of the bending strength by a value of Young's modulus (bending strength/Young's modulus) is $1.4 \times 10^{-3}$ or more.

11. The honeycomb filter according to claim 5, wherein a bending strength is 6.5 MPa or more, and a value obtained by dividing a value of the bending strength by a value of Young's modulus (bending strength/Young's modulus) is $1.4 \times 10^{-3}$ or more.

* * * * *